United States Patent Office.

MAGNUS SWENSON, OF FORT SCOTT, KANSAS.

MANUFACTURE OF SUGAR.

SPECIFICATION forming part of Letters Patent No. 371,528, dated October 11, 1887.

Application filed December 29, 1886. Serial No. 222,909. (No specimens.)

*To all whom it may concern:*

Be it known that I, MAGNUS SWENSON, a citizen of the United States, residing at Fort Scott, Kansas, have invented certain Improvements in the Manufacture of Sugar, of which the following is a specification.

My invention relates to the diffusion process of making sugar; and the object of my invention is to prevent the inversion of the cane-sugar in the diffusion-battery—an object which I attain by adding a carbonate of the alkaline earths to the diffusion-bath.

In the diffusion process of making sugar from sugar-cane the vegetable or organic acids in the cane-chips which diffuse out into the surrounding water tend to convert the cane-sugar into grape-sugar, and various attempts have been made to prevent this invertive action of the organic acids in the cane by adding lime or bisulphite of lime or other materials to the bath or battery; but such attempts have met with no practical success, for various reasons which it is not necessary to detail. I have found that by the employment of carbonates of the alkaline earths in the diffusion-battery this invertive action of the organic acids can be effectually stopped.

In carrying out my invention I take carbonate of calcium—by preference in the form of precipitated chalk, for instance—or other convenient form of carbonate of lime, and I reduce it to a fine powder. This powdered calcium carbonate is added to the cane-chips as they are fed into the cells in an amount exceeding that needed to neutralize the vegetable acids of the juice. It may be added either dry or suspended in water, care being taken, however, to have it uniformly distributed in the chips. When the vegetable acids in the cane-chips diffuse out into the surrounding water, they are neutralized by the finely-divided calcium carbonate, and their invertive action on the cane sugar is thus prevented.

The combination of the lime and carbonic acid in the calcium carbonate is a very weak one, so that the free acids from the chips at once combine with the lime and liberate the carbonic acid until the solution becomes neutral. The carbonic acid is too weak to have any effect on the cane-sugar, so that its liberation does no harm.

I am able to use an excess of the carbonate without detriment to the sugar, because the surplus of the carbonate over that needed to neutralize the acids remains inert and unchanged, since the carbonate of the alkaline earth is insoluble and neutral.

Instead of calcium carbonate, I may use any other convenient carbonate of the alkaline earths—such as carbonate of magnesium, or strontium, or barium; but I prefer calcium carbonate on account of its cheapness and effectiveness for the purpose.

I claim as my invention—

1. As an improvement in the diffusion process of making sugar, the mode herein described of preventing the invertive action of the organic acids in the cane-chips upon the sugar during the process of extraction, said mode consisting in adding to the diffusion-bath a carbonate of the alkaline earths, substantially as set forth.

2. As an improvement in the diffusion process of making sugar, the mode herein described of preventing the invertive action of the organic acids in the cane-chips upon the sugar during the process of extraction, said mode consisting in adding to the diffusion-bath calcium carbonate, substantially as set forth.

In testimony whereof I have signed my name to this specification in the presence of two subscribing witnesses.

MAGNUS SWENSON.

Witnesses:
    E. A. MUNSELL,
    E. F. WARE.